N. W. HARTMAN.
GLASS BLOWING MACHINE.
APPLICATION FILED JULY 12, 1909.

1,155,809.

Patented Oct. 5, 1915.
4 SHEETS—SHEET 1.

Witnesses.
E. B. Gilchrist
H. R. Sullivan

Inventor.
Noble W. Hartman
By Thurston Woodward
attorneys.

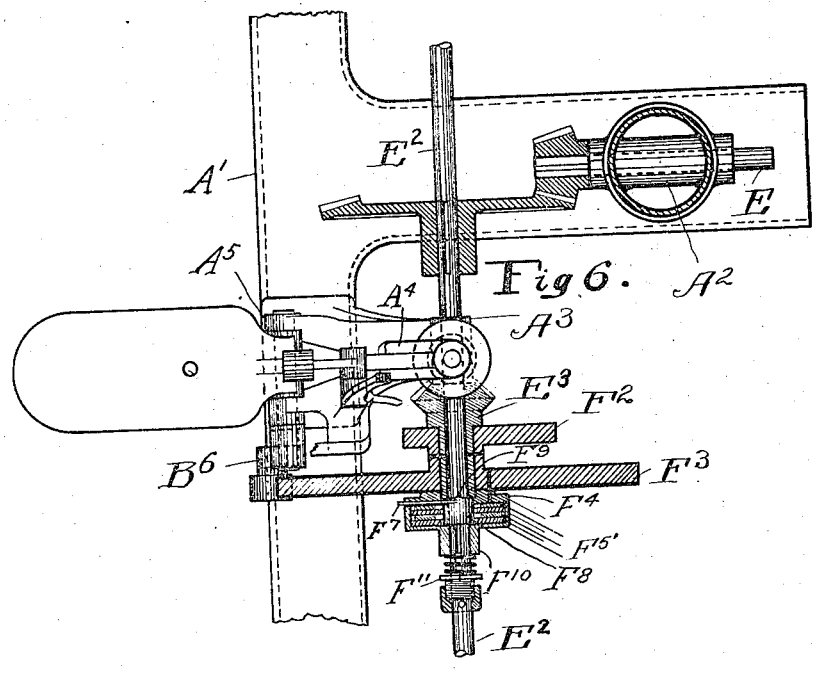
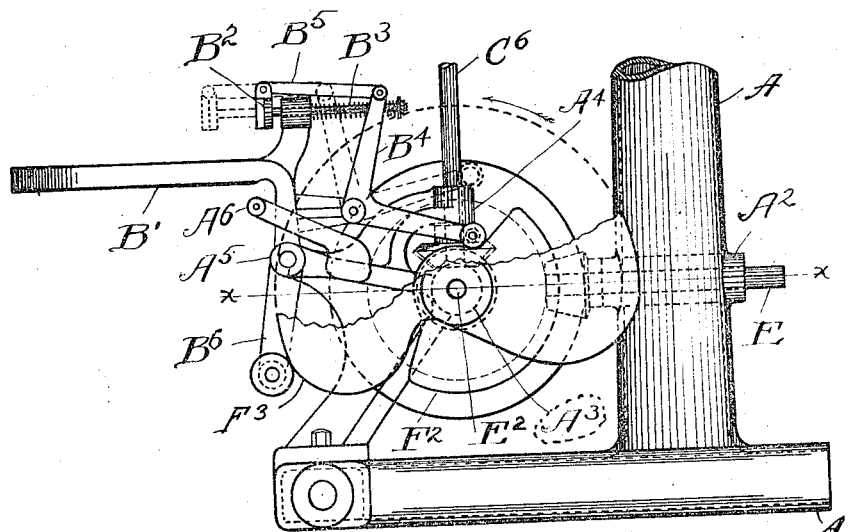

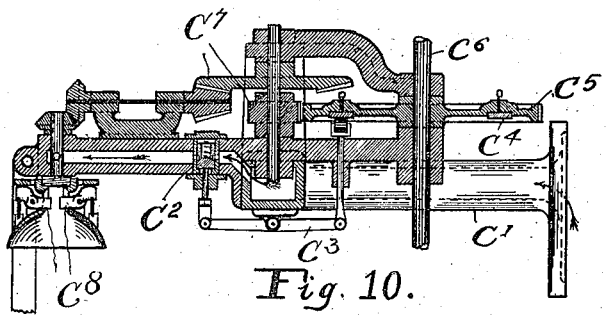
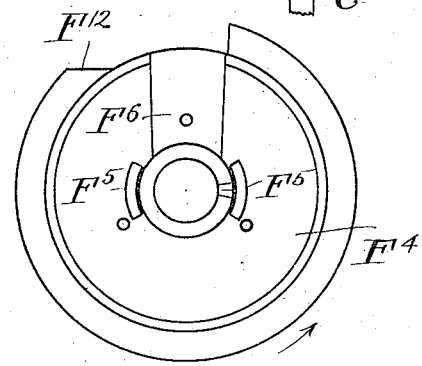
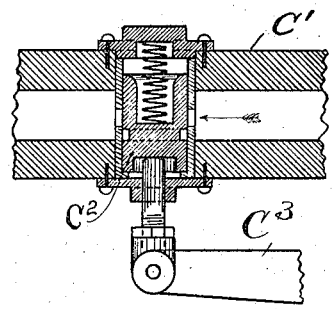
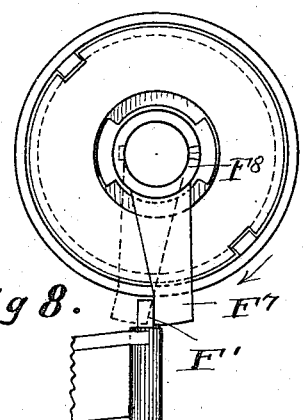
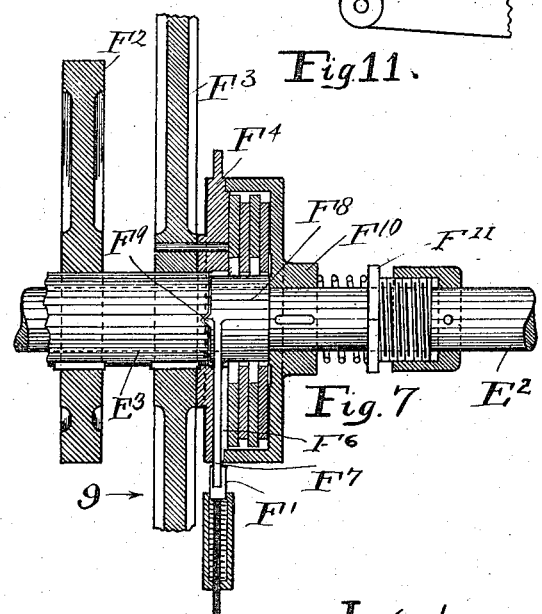

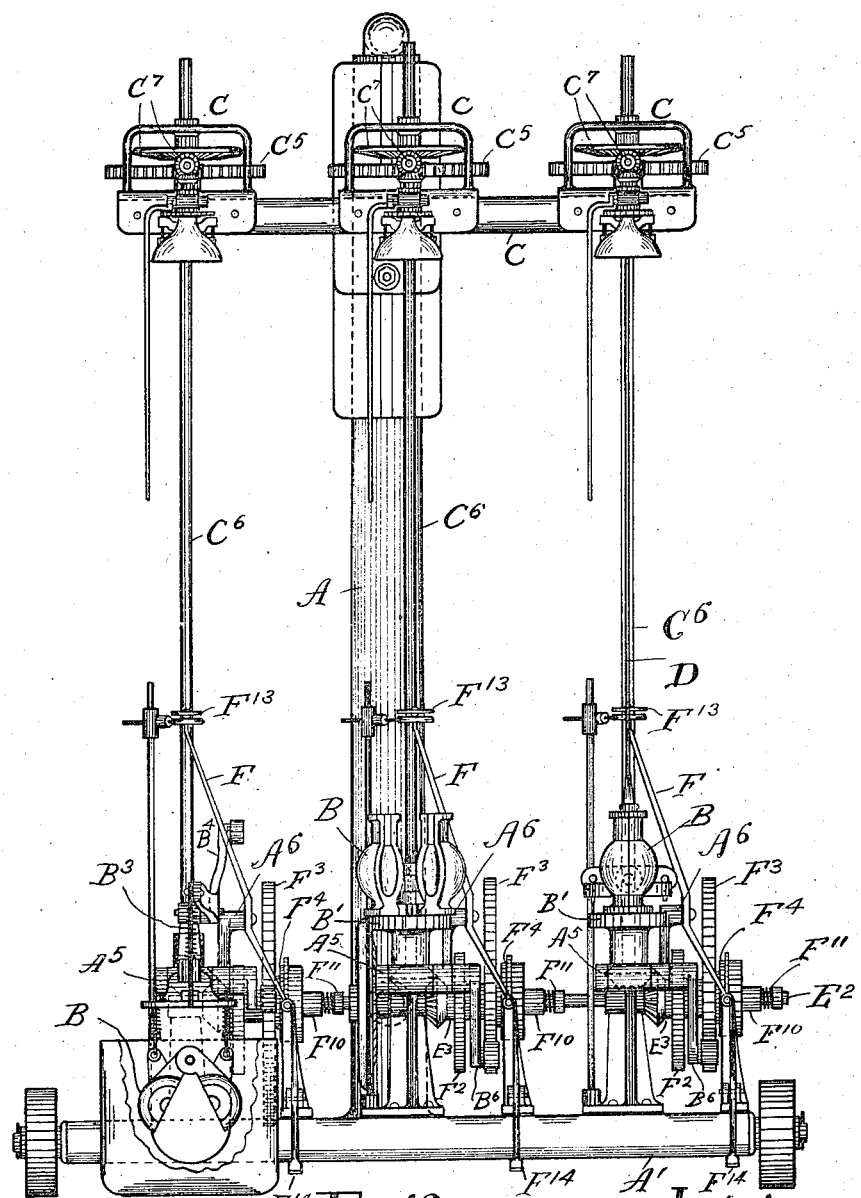

UNITED STATES PATENT OFFICE.

NOBLE W. HARTMAN, OF TOLEDO, OHIO, ASSIGNOR, BY MESNE ASSIGNMENTS, TO GENERAL ELECTRIC COMPANY, A CORPORATION OF NEW YORK.

GLASS-BLOWING MACHINE.

1,155,809.  Specification of Letters Patent.  Patented Oct. 5, 1915.

Application filed July 12, 1909. Serial No. 507,056.

*To all whom it may concern:*

Be it known that I, NOBLE W. HARTMAN, a citizen of the United States, residing at Toledo, in the county of Lucas and State of Ohio, have invented a certain new and useful Improvement in Glass-Blowing Machines, of which the following is a full, clear, and exact description.

The present invention relates to machinery for automatically blowing glass articles in molds.

More particularly, the class of machines to which it is directed is that adapted for blowing glass bulbs and similar articles requiring equal delicacy of work.

My object has been to produce apparatus which shall be capable of producing the finished article, which I shall hereafter, as a matter of convenience, call a bulb, with uniform results independently of those variations in point of time required by the feeder for obtaining the proper ball on the end of the blow iron.

A further object has been to provide such apparatus that a plurality of molds can be utilized by one or more feeders without the interference of one with the other in the matter of time of operation.

A further object has been to provide an automatic blowing machine in which the mold and blowing means shall not start into operation until the blowing iron is in position, but which shall remain in position ready for operation until the blowing iron is properly placed.

A still further object has been to provide automatic blowing mechanism in which the blow iron and the article shall be automatically ejected from the mold when the blowing operation is completed.

Figure 3:
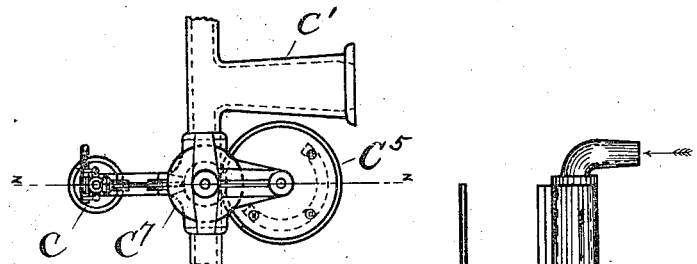
Figure 2:
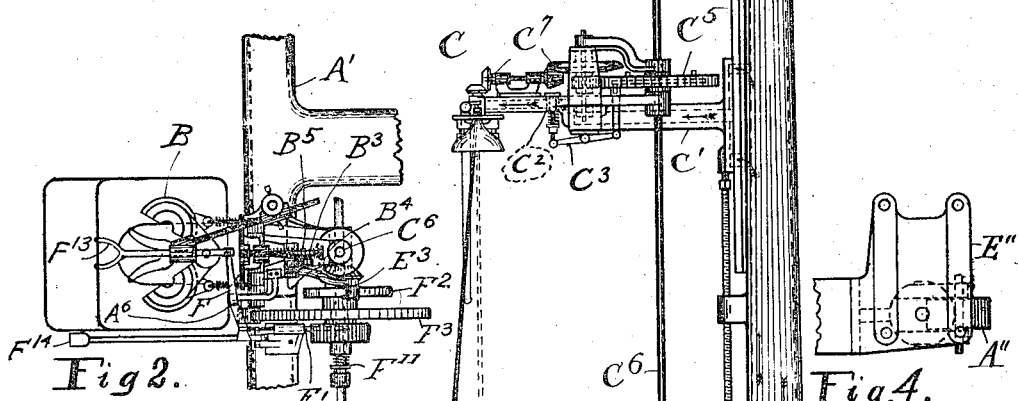
Figures 1, 13:
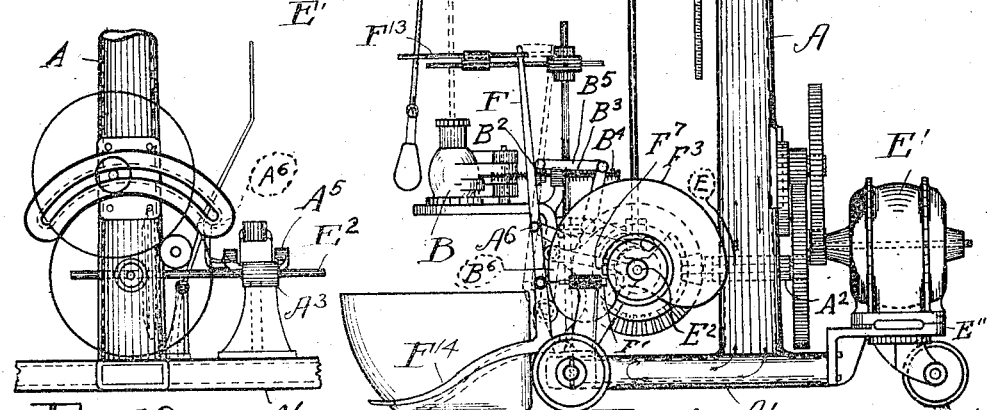

The above objects and other useful advantages it will be seen are attained by that embodiment of my invention described in the following specification and illustrated in the accompanying drawings, in which;

Figure 1 is a side elevation of one of my machines showing a single mold and the operating mechanism therefor. Fig. 2 is a top plan of the mechanism on the lower portion or base of this machine. Fig. 3 is a top plan showing the mechanism for controlling the admission of air to the blow iron mounted at the upper portion of the machine. Fig. 4 is a top plan of the heel of the machine frame, on which the motor for driving the apparatus is mounted. Fig. 5 is an enlarged side elevation partly broken away showing the fixed bearings in the frame for the operating parts and illustrating the position of the cams for controlling the movement of the mold. Fig. 6 is a horizontal section on the line $x$—$x$ of Fig. 5. Fig. 7 is an enlarged detail section of the automatic clutch controlling the cams shown in Fig. 6. Fig. 8 is an end view of one portion of the clutch showing the tripping dog lying against the detent which throws the clutch out of action. Fig. 9 is a side elevation of that portion of the clutch which is fixed to one of the cams. Fig. 10 is an enlarged vertical section of the blowing head. Fig. 11 is a further enlarged detail of the valve controlling the admission of air to the blow iron. Fig. 12 is a front elevation showing the relation of the different molds and their operating connections. Fig. 13 is a detail rear elevation diagrammatic of the driving connections at the rear of the frame, the bearings for the operating parts being shown in a modified arrangement.

The apparatus here illustrated involves the construction of frame having a vertical standard A mounted on a base $A'$ which in the present instance is itself carried on rollers $A^{11}$ so that it may be suitably located in the plant. On the base of the frame is carried the mold B. At the upper end of the standard is carried the blowing head C for manipulating the blow iron. This last named group of mechanism is somewhat similar in construction to that described in my prior Patent No. 813,289, issued February 20th, 1906.

The head comprises a hollow arm $C'$ designed to receive air from the vertical supporting column A. The flow of air through this arm is controlled by a valve $C^2$ which is operated through the medium of a rock arm $C^3$ and links, by a ring cam $C^4$ (see Fig. 10) adjustably mounted on the lower face of the web of a gear $C^5$ rotatably mounted on the vertical shaft $C^6$ which receives its rotative movement from the same mechanism that operates the mold, as will be subsequently described. By a train of step-up gears $C^7$ the rotary movement of the gear $C^5$ on which the said cam $C^4$ is mounted is transmitted to the gripping jaws $C^8$ by which the blow iron D is held. This gripping mechanism is similar to that shown in the patent referred to. By this arrangement, as distinguished from that of the patent, however, it will be seen that the control of air to any blow iron in a set can be controlled or varied without disturbing the control or character of air flow to the other blow irons in the same group.

The base of the apparatus has thereon a fixed bearing $A^2$ suitably located as, for example, in the hollow column A through which the air passes to the blowing head, which bearing is for the shaft E through which power is transmitted to the operating devices. Some suitable means, either under local control or not, as convenience may dictate, such, for example, as a motor $E'$ mounted on heel $E^{11}$ of the frame, gives rotative movement to said shaft which in turn communicates rotative movement, also constant, to the driving shaft $E^2$ of the machine, this shaft operating all of the molds and the blowing heads.

Rigidly mounted on the base is a casting having therein a number of bearings for the operating parts, which bearings have fixed relationship to each other by reason of being in the same rigid casting, thus preventing the several parts, whose operation must have exact correlation, from becoming displaced. In one of these bearings $A^3$ is mounted the driving shaft $E^2$ before mentioned (see Fig. 5). A second bearing $A^4$ is for the vertical shaft $C^5$ through which movement is transmitted to the blowing head. A third $A^5$ affords means for pivotally supporting the mold carrier $B'$. A fourth bearing $A^6$ affords means for pivotally mounting a lever F through which the detent $F'$ controlling the operating mechanism is released and through which the blow iron is automatically thrown from the mold. These several bearings all being rigid with respect to each other, insure the permanent correlationship of the operating parts.

Loosely mounted on the shaft $E^2$ so as to be freely rotated relative thereto is a bevel pinion having extending therefrom a bearing sleeve $E^3$ to which are keyed a pair of controlling cams, one $F^2$ designed for the purpose of opening the mold, the other $F^3$ designed for tilting the mold and carrier to dip the mold into the cooling liquid of a bath held in front of the machine. Pinned to the face of the cam $F^3$ so as to be rigid therewith is a plate $F^4$ forming one member of a multiple disk friction clutch, which comprises also the alternate disk members $F^{51}$ which rotate with the said plate after the manner usual in friction clutches of this type. On the face of this plate I also provide a groove $F^6$ in which lies an arm $F^7$ projecting from a hub $F^8$ mounted loosely on the shaft and lying in the center of the said clutch. This hub has on the face next to the cam $F^3$ a V-shaped projection $F^9$ designed to lie in a similarly shaped notch in the end face of the loosely rotatable sleeve $E^3$ on which the cams are keyed. This hub is of such width and the V-shaped projection is of such length that, although when the projection lies in the notch provided for it, the second member $F^{10}$ of the clutch, which has a sliding key connection with the shaft $E^2$, may be forced into operative position, nevertheless when the projection rides part way out of the notch the hub will act as a spacing device and force the sliding member of the clutch away from the member pinned to the cams and thus permit the cams to remain stationary. An adjustable collar $F^{11}$ threaded in another collar which is pinned to the shaft provides a shoulder against which a spring for the movable member $F^{10}$ of the friction clutch may bear.

The end of the arm $F^7$ projecting from the hub $F^8$ extends to substantially the peripheral face of the clutch plate $F^4$ against the face of which it lies. The edge of this plate is notched or cut away as at $F^{12}$ so as to allow the detent finger $F'$ to drop in front of the arm for the purpose of stopping it in its rotation and causing the V-shaped projection $F^9$ on the hub to ride partly out of the notch in which it lies. The groove $F^6$ on the face of the clutch plate is sufficiently wide to permit the necessary play of the arm. It will be seen, therefore, that if the detent finger $F'$, which is spring pressed, is permitted to operate under the influence of its spring, the clutch will be thrown out and held out of operation at the end of each revolution and the cams can be rotated by the constantly driven shaft $E^2$ only by the withdrawal of the detent member from the path of the arm.

The spring pressed detent finger is, as above pointed out, connected to one end of the hand lever F pivotally mounted in the bearing $A^6$, the upper end of which lever lies in a slot at the end of a sliding fork $F^{13}$ held in a suitable bearing above the mold. The forward end of the fork lies somewhat in advance of the mold when the former is in the position which it occupies while the upper end of the lever arm is thrown forward and the detent is thrown inward lying in the path of the clutch arm referred to. It will thus be seen that the swinging of the blow arm into the mold will push the fork to the rear and carry the lever F back so as to pull the detent $F'$ away from the clutch arm $F^7$ and thus throw into operation the bevel pinion on the sleeve of which the cams are keyed, which bevel pinion transmits rotary motion to the vertical shaft which operates the blowing head mechanism. By this means I may automatically throw the operating parts into motion through the simple act of moving the blow iron into position. For effecting the same control over the movement of the spring pressed detent I may also employ a foot lever $F^{14}$, as shown, which has a suitable connection with the detent at the point at which the detent is attached to the unlocking lever F.

When the detent is withdrawn so as to permit the clutch to be slipped back into operation by the spring pressure behind it, the detent finger F' will then ride upon the periphery of the plate member $F^4$ of the clutch and positively hold the lever F and the fork $F^{13}$ back, so that the blow iron hangs in the mold. As soon as the clutch rotates again to the proper point the detent will drop into the notch $F^{12}$ provided in the periphery of the plate member, which action will throw the upper end of the unlocking lever outward and thrust the blow iron forward moving it out of the way of the mold which will immediately preceding this have been opened by means of mechanism controlled by the cam $F^2$, as will be subsequently described.

The mold itself is shown as of the conventional shape in which the parts are hinged and swung toward and from each other through the medium of a cross head $B^2$, which is pushed in the opening direction by a spring $B^3$ surrounding a pin projecting from said cross head, and it is closed by the cam $F^2$ operating through a bell crank $B^4$ and link connection $B^5$, the said bell crank being journaled on the mold carrier B', and the link being pivotally connected to the bell crank and the cross head. This cam is timed to close the molds immediately upon the placing of the blow iron in position and the throwing of the clutch into operation. The cam then continues to hold the mold closed during a portion of the revolution of the bevel gear on the hub $E^2$ of which it is mounted. At a certain point in the revolution of this cam the bell crank controlling the cross head $B^2$ is released and the latter is permitted to move back under spring pressure and open the mold. Immediately after the opening of the mold the detent F' drops in the notch $F^{12}$ and the sliding fork $F^{13}$ throws the blow iron and the finished bulb outward. After this point the cam $F^3$ controlling the mold carrier, on which the mold is mounted, permits the latter to drop forward into the cooling trough. This last named cam controls the movement of the mold carrier through the medium of a tail piece $B^6$ projecting beyond the pivot on which the mold carrier is mounted, which tail piece has an anti-friction roller riding on the peripheral surface of the cam.

The subsequent movement of the cam controlling the mold carrier lifts it from the cooling trough and holds it in position for the next operation. The detent F' controlling the clutch arm then abuts against said arm and throws out the clutch, and consequently the entire operating mechanism at the same time. The apparatus is then in position for a repetition of the operation.

By the arrangement above described it will be seen that I have provided means whereby a series of molds may be operated side by side and continuously fed by a feeder who may time the start of the blowing operation in each mold in exact accordance with the requirements of the gathered glass on the end of the iron. It frequently happens that the gathered glass is not in condition to place in a mold at precisely the same number of seconds after the iron has been dipped into the batch. It is for this reason that those machines where a plurality of molds have been used (such, for example, as the rotary machines that have been used for coarser and heavier articles up to the present time) have been less efficient for such delicate articles as bulbs for incandescent lamps. With the construction which I have here shown, however, it will be seen that it is possible for a feeder to manipulate as many of the molds as he may be individually able to attend and not be under the compulsion of inserting the blow iron into the blowing machine either before or after the exact moment at which the gathered glass is ready, owing to the fact that each of the molds, although operating absolutely automatically to give the proper treatment to the glass when it once starts, nevertheless remains in receptive position until the feeder starts it either through the automatic means described or by working the foot lever which also controls the detent. This means of rendering the several molds in the machine automatic in their operation of blowing and reproducing the same results at each operation, but capable of being held out of operation for such variable lengths of time as the individual article being treated therein may require, eliminates one of the greatest objections heretofore urged against the rotary machines in which the several molds are brought to feeding position and moved away from the same at exact intervals. Glass gatherers have urged against these rotary machines the fact that it is almost impossible to have the gathered glass in condition at the exact moment at which the mold is ready to receive it.

It has further been found that in the use of automatic machines it is sometimes desirable to have part of the molds of slightly different size or shape from the others. This inability to time the gathered glass exactly with the moment of presentation of the mold in a rotary machine is so serious as to almost prohibit the use of different molds on a machine for blowing such delicate articles as bulbs. With my machine, however, it will be seen that the feeder can give his entire attention to the condition of the gathered glass and place it in the machine at exactly the proper moment and immediately turn his attention to gathering for the next bulb, since he can rely upon the mechanism, controlling the mold automatically, bringing the latter to a full stop empty and in receptive condition after having given the bulb therein a standard treatment, all without any further attention upon his part either in the matter of operation or in the time at which the operation ceases.

Having thus described my invention, I claim:

1. In a glass blowing machine, a mold, a blow head and means for supporting a blow iron, and means for automatically opening the mold and moving the blow iron to a position where the article blown is clear of the mold.

2. In a glass blowing machine, a mold, a blow head and means for supporting a blow iron, and means for automatically opening the mold and moving the blow iron to a position where the article blown is clear of the mold at a predetermined interval after the initiation of the blowing operation.

3. In a glass blowing machine, an operating shaft, a blow head, connections between the operating shaft and the blow head, and means in the path of the blow iron for automatically throwing in said connections when the blow iron is moved to operating position over the mold.

4. In a glass blowing machine, a mold, an operating shaft, a blow head, connections between the operating shaft and the blow head, a removable blow iron, means comprised by the blow head for receiving the said blow iron and for allowing it to be swung into position over said mold, and means automatically brought into operation upon the positioning of the said blow iron for throwing in the said connections.

5. In a glass blowing machine, an operating shaft, a driven shaft, a clutch therebetween, a blow head and sub-mechanism whereby the same is operated from said driven shaft, a mold, a removable blow iron adapted to be inserted in said blow head and swung over said mold and means in the path of said blow iron during said swinging movement thereof for operating said clutch and thereby starting the operation of said sub-mechanism.

6. In a glass blowing machine, a blow head comprising a valve and operating mechanism therefor, a blow iron and means for removably holding the same in operative position with respect to said blow head, a mold and means for opening and closing the same, an operating shaft, a driven shaft, a clutch between said shafts, connections between said driven shaft, said valve operating mechanism and said mold operating means and means automatically actuated upon the insertion of said blow pipe and placing the same over said mold for throwing in said clutch.

7. In a glass blowing machine, a blow head comprising a valve and operating mechanism therefor, a blow iron and means for removably holding the same in operative position with respect to said blow head, a mold and means for opening and closing the same, an operating shaft, a driven shaft, a clutch between said shafts, connections between said driven shaft, said valve operating mechanism and said mold operating means, means automatically actuated upon the insertion of said blow pipe and placing the same over said mold for throwing in said clutch, and means for throwing out said clutch upon the completion of a predetermined cycle of operations.

8. In a glass blowing machine, an operating shaft, a driven shaft, a clutch therebetween, a blow head and sub-mechanism whereby the same is operated from said driven shaft, a mold, a removable blow iron, means for receiving said blow iron at an angle to the vertical and for allowing it to be swung to a vertical position over said mold, and means automatically brought into operation during the swinging movement of said blow iron for controlling said clutch and thereby controlling the operation of said sub-mechanism.

9. In a glass blowing machine, an operating shaft, a driven shaft, a clutch therebetween, a blow head and sub-mechanism whereby the same is operated from said driven shaft, a mold, a removable blow iron adapted to be inserted into the blow head and swung over said mold, and means in the path of said blow iron during said swinging movement thereof for controlling said clutch and thereby controlling the operation of said sub-mechanism.

In testimony whereof, I hereunto affix my signature in the presence of two witnesses.

NOBLE W. HARTMAN.

Witnesses:
H. R. SULLIVAN,
E. B. GILCHRIST.

Copies of this patent may be obtained for five cents each, by addressing the "Commissioner of Patents, Washington, D. C."